United States Patent [19]
Vervloet

[11] 3,905,925
[45] Sept. 16, 1975

[54] PROCESS FOR PREPARING POLYURETHANE PRODUCTS
[75] Inventor: Christiaan Vervloet, Delft, Netherlands
[73] Assignee: Shell Oil Company, Houston, Tex.
[22] Filed: Feb. 25, 1974
[21] Appl. No.: 445,703

[30] Foreign Application Priority Data
Feb. 14, 1974 United Kingdom............... 6858/74

[52] U.S. Cl................. 260/2.5 BD; 260/2.5 AM; 260/2.5 AT; 260/77.5 AA; 260/77.5 AM; 260/77.5 AP
[51] Int. Cl.... C08g 22/48; C08g 22/16; C08g 22/18
[58] Field of Search. 260/2.5 BD, 2.5 AT, 77.5 AA, 260/2.5 AM, 77.5 AM, 77.5 AP

[56] References Cited
UNITED STATES PATENTS

| | | | |
|---|---|---|---|
| 3,047,517 | 7/1962 | Wherley | 260/2.5 AN |
| 3,192,186 | 6/1965 | Muller | 260/2.5 AM |
| 3,284,539 | 11/1966 | McElroy | 260/77.5 AM |
| 3,670,070 | 6/1972 | Appleton | 260/2.5 AM |
| 3,769,245 | 10/1973 | Stewart | 260/2.5 AM |

*Primary Examiner*—Melvyn I. Marquis
*Assistant Examiner*—C. Warren Ivy

[57] ABSTRACT

The present invention is concerned with a process for preparing polyurethane products, which may be solid polyurethane products or microcellular foam polyurethane products, from quasi-hydroxyl-prepolymers and quasi-isocyanate prepolymers (sometimes also called semi-prepolymers).

16 Claims, No Drawings

PROCESS FOR PREPARING POLYURETHANE PRODUCTS

DETAILED DESCRIPTION OF THE INVENTION

According to the present invention, a process for preparing polyurethane products comprises reacting a. a quasi-isocyanate prepolymer comprising a composition prepared from a di-isocyanate, having an average molecular weight in the range of from 100 to 500, and a high molecular weight diol, having an average molecular weight in the range of from 500 to 4,500, wherein the amount of di-isocyanate is from 3 to 12 moles per mole of high molecular weight diol, with b. a quasi-hydroxyl prepolymer comprising a composition prepared from
   i. a true-isocyanate prepolymer prepared from a di-isocyanate, having an average molecular weight in the range of from 100 to 500, and a high molecular weight diol having an average molecular weight in the range of from 500 to 4,500, wherein the amount of di-isocyanate is from 1.8 to 2.2 moles per mole of high molecular weight diol, and
   ii. a low molecular weight diol, having an average molecular weight in the range of from 60 to 250, wherein the amount of low molecular weight diol is from 4 to 17 moles per mole of high molecular weight diol used to prepare the true-isocyanate prepolymer, wherein the reaction mixture has an isocyanate index of above 100 and less then 115.

The polyurethane products prepared according to the above process may be solid (i.e. non-cellular) or micro-cellular foam and may be thermoplastic and elastomeric.

The reaction mixture has a preferred isocyanate index of not less than 101 and more preferably of from 101 to 105. The isocyanate index of the reaction mixture refers to the isoscyanate index based on the total hydroxyl-group containing compounds and isocyanate-group containing compounds which are used to form the reaction mixture.

The two quasi-prepolymers for use in the above process may be prepared by one-stage or two-stage processes, with the former being preferred.

In the two-stage process for the preparation of the quasi-isocyanate prepolymer, about 2 moles of di-isocyanate are reacted with about 1 mole of high molecular weight diol (this first-stage product is hereinafter referred to as a true-isocyanate prepolymer and is characterized by having terminal isocyanate groups) followed by the addition of from 1 to 10 moles, preferably from 2 to 4 moles, of di-isocyanate per mole of high molecular weight diol used to prepare the true-isocyanate prepolymer. The final product is referred to as a quasi-isocyanate prepolymer.

The first-stage of the above two-stage process is most suitably carried out at a temperature above the melting point of the di-isocyanate. However, for control of the process as well as for its economy, temperatures should not be raised much above the said melting point. In general, there is no need to use temperatures more than 50°C or even more than 20°C above the said melting point. Temperatures less than 10°C or even less than 5°C above the said melting point are, generally, found to be suitable. The reaction is, preferably, carried out in the absence of solvents and/or diluents. Moreover, the reaction is, preferably, carried out under substantially anhydrous conditions, that is to say, water is excluded from the reaction mixture to such an extent that the reaction proceeds essentially between the hydroxyl groups and the isocyanate (or isothiocyanate) groups. In general, in such case the water content of the reaction can be up to 0.1% by weight of the reaction mixture. When a larger amount of water, e.g., up to about 0.5% by weight is present in the reaction mixture, this leads to a "water-branched" prepolymer. The reaction is conveniently carried out in an atmosphere of dry inert gas, e.g., nitrogen or carbon dioxide, and, if desired, under reduced pressure. A catalyst may be added but it has, in general, been found preferable to avoid the use of catalysts, as this tends to lead to less regular molecular structures and, consequently, to less favourable properties of the final polyurethane products.

The second-stage of the above two-stage process is most suitably carried out by stirring the additional di-isocyanate into the true-isocyanate prepolymer at an elevated temperature.

In the preferred one-stage process for the preparation of the quasi-isocyanate prepolymer, from 3 to 12 moles, preferably from 4 to 6 moles, of di-isocyanate are added to about 1 mole of high molecular weight diol. The final product is referred to as a quasi-isocyanate prepolymer.

The one-stage process is suitably carried out under the same conditions as are described above for the preparation of the true-isocyanate prepolymer.

Whether or not a one-stage or two-stage process is used for the preparation of the quasi-hydroxyl prepolymer it is first necessary to prepare a product (hereinafter referred to as a true-isocyanate prepolymer) by reacting from 1.8 to 2.2 moles of di-isocyanate with 1 mole of high molecular weight diol. In fact, the true-isocyanate prepolymer prepared in the first-stage of the two-stage process for the preparation of the quasi-isocyanate prepolymer may be used. The conditions for the preparation of the true-isocyanate preopolymer may be the same as described hereinabove.

In the two-stage process for the preparation of the quasi-hydroxyl prepolymer, about 2 moles of low molecular weight diol are reacted with the true-isocyanate prepolymer (this first-stage product is hereinafter referred to as a true-hydroxyl prepolymer and is characterized by having terminal hydroxyl groups) followed by the addition of from 2 to 15 moles of low molecular weight diol (the number of moles of low molecular weight diol are for each mole of high molecular weight diol used in the preparation of the true-isocyanate prepolymer).

The first-stage of the above two-stage process is conveniently started by gentle heating, e.g. to a temperature between 25° and 100°C, preferably between 30° and 75°C, most preferably between 40° and 60°C, especially to a temperature of approximately 50°C. As the reaction is exothermic, a rise of the temperature will occur as soon as the reaction gets started. Preferably, the temperature is not allowed to rise as high as to 150°C, temperatures between 50° and 100°C and, especially, between 60° and 85°C being preferred. Very suitable are temperatures of approximately 75°C.

The second-stage of the above two-stage process is most suitably carried out by stirring the additional low molecular weight diol into the true-hydroxyl prepolymer at an elevated temperature.

In the preferred one-stage process for the preparation of the quasi-hydroxyl prepolymer from 4 to 17 moles, preferably from 5 to 9 moles, of low molecular weight diol are added to the true-isocyanate prepolymer (the number of moles of low molecular weight diol are for each mole of high molecular weight diol used in the preparation of the true-isocyanate prepolymer).

The one-stage process is suitably carried out under the same conditions as are described above for the preparation of the true-hydroxyl prepolymer.

It is preferred to prepare the polyurethane products from a quasi-isocyanate prepolymer and a quasi-hydroxyl prepolymer wherein both prepolymers have been prepared by one-stage processes since such prepolymers have processing advantages over those prepared by two-stage processes.

It may be desirable to add a viscosity modifier, which may or may not take part in the polyurethane-product forming reaction, to either the quasi-isocyanate prepolymer or quasi-hydroxyl prepolymer. In practice it is preferred to add a poly-tetrahydro-furan (e.g. "Polymeg" 650, ex Quaker Oats Limited) to the quasi-hydroxyl prepolymer. A suitable amount is from 0.5 to 1.5 moles for each mole of high molecular weight diol present in the quasi-hydroxyl prepolymer.

When the process of the present invention is being used to prepare microcellular foam polyurethane products it is necessary to include a blowing agent in the quasi-hydroxyl and/or quasi-isocyanate prepolymer or to add separately a blowing agent to the reaction mixture. The blowing agent may be a volatile halohydrocarbon, such as trichlorofluoromethane, but is preferably water. Generally, water is premixed with the quasi-hydroxyl prepolymer in an amount of from 0.5 to 1.0 parts per hundred parts of quasi-hydroxyl prepolymer, quasi-isocyanate prepolymer and other additives, e.g. viscosity modifier, if any. It may also be desirable to premix the quasi-hydroxyl prepolymer with a silicone oil surfactant for the preparation of microcellular foam polyurethane products.

When the process of the present invention is being used to prepare solid polyurethane products it is desirable to premix the quasi-hydroxyl prepolymer with an antioxidant and/or other stabilizing systems.

Also, when solid polyurethane products are prepared it has been found that the properties of the products are more uniform and constant when a constant shear is exerted during the gelation of the polyurethane product. A preferred shear rate is in the range of from 100 to 10,000 sec$^{-1}$. The gelation may be carried out in an Extruder or Brabender plastograph.

Whether or not the process of the present invention is being used to prepare microcellular foam or solid polyurethane products it is usual to include in the reaction mixture, preferably by premixing with the quasi-hydroxyl prepolymer, ancillary components such as polyurethane catalysts, such as tertiary amine and/or organotin compounds; plasticizers, such as "Linevol" 79P; colouring agents; and fillers.

When preparing polyurethane products according to the present invention it is desirable that the quasi-isocyanate prepolymer, quasi-hydroxyl prepolymer and other additives, if any, are intimately mixed. In general mixing on a roller is very effective. However, in many instances mixing in a pouring, casting or spraying device is more suitable, especially when the said device is employed for applying the mixtures to a surface or introducing them into a mould, the reaction predominantly proceeding after application to the surface or introduction into the mould, and at most only to a lesser extent in a previous stage.

When making use of such pouring, casting or spraying devices, difficulties are encountered as regards dosage and adequate mixing when the viscosities of the two reactants are too much at variance. It is desirable that the mixing ratio by volume is about 1:1 (of the quasi-prepolymers including additives therein).

Both the quasi-hydroxyl prepolymer and the quasi-isocyanate prepolymer are highly viscous liquids at ambient temperature and they are both preferably heated, before reacting them together, to temperatures such that they have similar viscosities. Preferably, the quasi-isocyanate prepolymer is heated to a temperature of from 25° to 50°C and the quasi-hydroxyl prepolymer is heated to a temperature of from 35° to 65°C. The heated quasi-prepolymers are then reacted, to form polyurethane products, preferably at a temperature of from 25° to 100°C.

The di-isocyanate, having an average molecular weight in the range of from 100 to 500, preferably from 150 to 300, which is used to prepare both the quasi-isocyanate prepolymer and the true-isocyanate prepolymer may be the same or different and may be any di-isocyanate-substituted aliphatic, cycloaliphatic, aromatic or mixed hydrocarbons. Other substituents besides the two isocyanato groups may be present, provided, of course, any such substituents do no interfere with the reaction leading to polyurethane formation. Particularly suitable di-isocyanates include, e.g., 4,4¹-methylene diphenyl-di-isocyanate (with the isocyanate groups in the para-positions), toluidine di-isocyanate, which has the following formula:

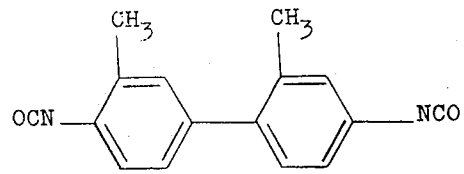

toluene di-isocyanate, usually a mixture of the 2,4- and the 2,6-isomers, and naphthalene di-isocyanate, usually only or at any rate predominantly the 1,5-isomer. Both the quasi-isocyanate prepolymer and the true-isocyanate prepolymer may be prepared from mixtures of different di-isocyanates.

The high molecular weight diol, having an average molecular weight in the range of from 500 to 4,500, preferably from 500 to 2,500, which is used to prepare both the quasi-isocyanate prepolymer and the true-isocyanate prepolymer may be the same or different. Both the quasi-isocyanate prepolymer and the true-isocyanate prepolymer may be prepared from mixtures of different high molecular weight diols. Preferred among the high molecular weight diols are those which are polymers or copolymers of ethylene glycol, 1,2-propane diol and 1,4 butane diol. This means that the high molecular weight diols are linear polyethers having two hydroxyl groups at the end of the chain, or derivatives of such linear polyethers having methyl or ethyl groups as substituents on all or part of the constituent radicals. The presence of such substituents at the end of the chain may cause one or both of the hydroxyl groups to be secondary rather than primary in nature. The arrangement of the substituents in the polymer molecule may be isotactic or syndiotactic, so that the polymers concerned may be easily made to crystallize. However, non-crystalline atactic polymers with a more or less random and non-stereo-specific distribution of the substituents are as a rule much more easily and, therefore, cheaply produced.

Preferred among the polyethers which have just been discussed are poly-1,2-propanediols and poly-1,4-butanediols, that is homopolymers of 1,2-propanediol and of 1,4-butanediol, respectively. The latter have straight chains without methyl or ethyl substituents and primary hydroxyl groups at the end of the chains. However, the poly-1,2-propanediols have methyl substituents. When produced in the manner which is normal for obtaining molecular weights in the range desired in connection with the present invention, the distribution of the methyl groups is atactic, and the hydroxyl groups at the end of the chain are predominantly or even practically entirely secondary in nature. The normal production process, just referred to, which is economically sufficiently attractive for use on an industrial scale, consists in the polymerization of propylene oxide, a small amount of propylene glycol being required to start chain formation according to the reaction equation:

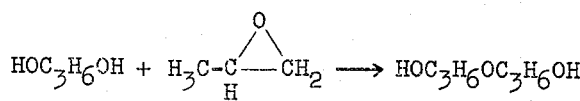

Further addition of propylene oxide may then take place so that polyether chains are formed of the general formula:

$$HOC_3H—(OC_3H_6)_{\overline{n}}—OH$$

in which $n$ is an integer. However, it has been found that in general polyether chains of the general formulae:

$$H_2C=CH—CH_2—(OC_3H_6)_{\overline{n}}—OH$$

or $$H_3C—CH=CH—(OC_3H_6)_{\overline{n}}—OH$$

(the so-called "allyl form" and "propenyl form", respectively) are formed as well. It has been put forward in explanation of this effect that the chains concerned do not start from a propylene glycol molecule, but from an ion formed from propylene oxide which is subject to desmotropical rearrangement.

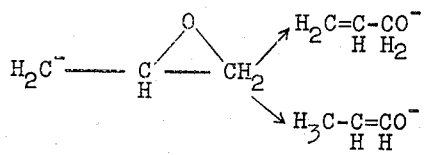

The original ion is formed from propylene oxide in that a proton is split off and becomes attached to a hydroxyl ion present in the reaction medium. The ions comprising olefinic double bonds may form larger ions together with one or more molecules of propylene oxide and finally take up a proton again, or they may first take up a proton and then react with propylene oxide.

The low molecular weight diol, having an average molecular weight in the range of from 60 to 250, preferably from 60 to 128, which is used to prepare the quasi-hydroxyl prepolymer from the true-isocyanate prepolymer include alkylene glycols as well as low-molecular polymers and/or copolymers of the same. Such diols are exemplified by ethylene glycol, 1,2-propene diol and its 1,3-isomer, usually denoted by the name trimethylene glycol, and the various diols derived from n-butane and isobutane, in particular 1,4-butanediol, which may also be called tetramethylene glycol.

Preferably, the number average molecular weight of the polyurethane products prepared by the process of the present invention is in the range of from 20,000 to 200,000, the range of from 30,000 to 100,000 being most preferred. Since terminal hydroxyl groups tend to have an adverse effect on the strength of the product, it is necessary to promote the formation of polymer chains with terminal isocyanate groups and according to the process of the present invention the reaction mixture should have an isocyanate index of above 100 and less than 115. When using approximately equimolar proportions of the two reactants (i.e. an isocyanate index of 100) there is too much chance that formation of long-chain molecules having terminal hydroxyl groups will occur to an undesirable extent.

It is considered that domains are formed in the polyurethane products prepared according to the process of the present invention. Reference may be made in this connection to a paper by J. A. Koutsky et al. in J. Polymer Science, Section B, Polymer letters, Vol. 8, pages 353–359 (1970). The domains, just mentioned, provide the desired degree of stiffness, whereas the parts of the molecular chains which connect the said domains provide the desired degree of flexibility and extensibility. As the binding forces in the domains are non-chemical in nature, contrary to bridges formed by cross-linking agents, the structure of the polyurethanes can be broken up by heating. This means that the products are thermoplastic, which is very advantageous for recovery and re-use of the polyurethane products from articles which have lost their usefulness, e.g., owing to wear. A certain regularity of molecular chain structure is required as a condition for the large-scale formation of polyurethane products comprising domains as set out above. On the other hand complete avoidance of cross-linking and/or branching is not strictly required. Accordingly, the scope of the present invention should not be limited by the exclusion of all the processes which lead to the formation of polyurethane products with some cross-linking and/or branching.

The solid polyurethane products, which may be thermoplastic and elastomeric, which may be made according to the process of the invention, can be further processed in the same manner as conventional rubber materials. Extender oils can be added as well as other rubber-like materials. Conventional processing equipment can be used, including mixing mills, Banbury mixers, extruders and calendering equipment. Shaping can be effected by, e.g., press-moulding and injection moulding. They may be used in adhesives, in particular solvent-based adhesives. The adhesives may be pressure-sensitive or contact adhesives. Their solutions may be used for coating purposes. Application is possible by roller coating as well as spraying. They may further be employed as modifiers of thermoplastics, including polyethylene and polypropylene, as well as of bitumen. They are suitable as packing materials, e.g., for medical equipment and for food. They may be processed to form sheets useful for the production of numerous classes of objects. Sheets may also be employed for backing of other materials, e.g. for backing of felt carpet tiles. Generally, they are suitable for all applications in the conventional rubber field where economic advantages, because of more efficient processing and the absence of vulcanization, can be realized. Articles which can suitably be made from the polyurethane elastomers include, e.g., mats, e.g. gramophone turntable mats, and bath mats, toy-car tyres, suction cups, erasers, dust caps, tap swirls, dropper bulbs, wheels for domestic and hospital use, ski goggles, safety masks, electrical plugs, cushion pads for vacuum flasks, coat hangers, flexible magnets, acid tubing for batteries, covers for car steering wheels and wig stands. It will be appreciated that this list is by no means exhaustive.

Of great importance is the use of polyurethane products, both microcellular and solid in the production of footwear. Shoes and boots may be made entirely or predominantly of such polyurethane products, but also from other materials, e.g., canvas, coated with them. Furthermore, polyurethane products may be used as materials for which parts of footwear, e.g. soles, heels or heel top pieces are made.

The invention will now be illustrated by the following Examples.

EXAMPLE 1

Preparation of quasi-isocyanate prepolymer (2-stage process)

Polypropylene glycol (M.W. 1,500, 1.0 mole) was reacted with 4,4'-methylene-diphenyl di-isocyanate (2.0 mole) at 80°C for from 3-5 hours to form a true-isocyanate prepolymer. A further 3.0 mole of the di-isocyanate was then added to the true-isocyanate prepolymer. The quasi-isocyanate prepolymer so formed was stabilized with 0.05% weight benzoyl chloride.

EXAMPLE 2

Preparation of quasi-isocyanate prepolymer (1-stage process)

Polypropylene glycol (M.W. 1,500; 1.0 mole) was reacted with 4,4'-methylene-diphenyl di-isocyanate (5.0 mole) at 80°C for from 3-5 hours. The quasi-isocyanate prepolymer so formed was stabilized with 0.5% weight benzoyl chloride.

EXAMPLE 3

Preparation of quasi-hydroxyl prepolymer (2-stage process)

i. Polypropylene glycol (M.W. 1,500; 1.0 mole) was reacted with 4,4'-methylene-diphenyl di-isocyanate (2.0 mole) at 80°C for from 3-5 hours to form a true-isocyanate prepolymer (i).

ii. The true-isocyanate prepolymer (i) was then reacted with butane-1,4-diol (2 mole for each mole of polypropylene glycol used to prepare true-isocyanate prepolymer (i)) to form a true-hydroxyl prepolymer.

iii. 5 Moles of butane-1,4-diol were then added to the true-hydroxyl prepolymer (for each mole of polypropylene glycol used to prepare true-isocyanate prepolymer (i)) to form a quasi-hydroxyl prepolymer.

EXAMPLE 4

Preparation of quasi-hydroxyl prepolymer (1-stage process)

i. A true-isocyanate prepolymer (i) was prepared in the same manner as described in Example 3 (i).

ii. 7 Moles of butane-1,4-diol were then added to true-isocyanate prepolymer (i) (for each mole of polypropylene glycol used to true-isocyanate prepolymer (i)) to form a quasi-hydroxyl prepolymer.

EXAMPLE 5

Preparation of microcellular foam polyurethane products i. Microcellular polyurethane foam was prepared by mixing the quasi-isocyanate prepolymer, prepared according to Example 1, with the quasi-hydroxyl prepolymer, prepared according to Example 3, in a weight ratio of about 15:1 and at equal viscosities of about 1,000 cP. Prior to mixing the quasihydroxyl prepolymer was mixed with 1 mole of poly-tetrahydrofuran diol "Polymeg" 650; (M.W. 650; Ex Quaker Oats Ltd.) for each mole of polypropylene glycol in the quasi-hydroxyl prepolymer 1 pph silicone oil, 0.075 pph triethylene diamine, 0.045 pph of dibutyl tin dilaurate and 1.5 pph Zusatzmittel S19 (containing about 50% water; ex Bayer). The parts per hundred (pph) are based on the total weight of quasi-isocyanate prepolymer, quasi-hydroxyl prepolymer and Polymeg 650. The isocyanate index of the reaction mixture was about 102.

ii. Microcellular polyurethane foam was prepared in a similar manner as in (i) above except that the quasi-isocyanate prepolymer, prepared according to Example 2, and the quasi-hydroxyl prepolymer, prepared according to Example 4, were used. Some properties of the foam so prepared are given in Table 1.

EXAMPLE 6

Preparation of solid polyurethane products i. Solid polyurethane was prepared by mixing the quasi-isocyanate prepolymer, prepared according to Example 1, with the quasi-hydroxyl prepolymer, prepared according to Example 3, in a weight ratio of about 1.5:1 and at equal viscosities of about 1,000 cP. Prior to mixing the quasi-hydroxyl prepolymer was mixed with one mole of Polymeg 650 (see Example 5 (i)), 5 pph of non-reactive plasticizer, 0.075 pph triethylene diamine and 0.045 dibutyl tin dilaurate. Dynamic gelation was carried out in a Brabender plastograph at 100°C and at a rotor speed of 5.9 rad/sec. The thermoplastic rubber obtained was milled at 170°-180°C and pressed at 160°-170°C.

The parts per hundred (pph) are based on the total weight of quasi-isocyanate prepolymer, quasi-hydroxyl prepolymer and Polymeg 650. The isocyanate index of the reaction mixture was about 102.

ii. Solid polyurethane product was prepared in a similar manner as in (i) above except that quasi-isocyanate prepolymer, prepared according to Example 2, and the quasi-hydroxyl prepolymer, prepared according to Example 4, were used. Some properties of the thermoplastic solid polyurethane product so prepared are given in Table 1.

TABLE 1

| Property | Microcellular foam polyurethane product (1 week after preparation) | Solid polyurethane product (1 week after preparation) |
| --- | --- | --- |
| Density (kg/m³) | 550 – 600 | 1150 |
| Hardness (Shore A) | 60 – 70 | 75 – 85 |
| Tensile strength (kg/cm²) | 50 – 60 | 200 – 400 |
| Elongation at break (%) | 450 | 500 – 700 |
| Modulus 100% | 21 | — |
| Modulus 300% | — | 100 – 120 |

I claim:

1. A process for preparing polyurethane products which comprises contacting a quasi-hydroxyl prepolymer with a molar excess of quasi-isocyanate prepolymer wherein the resulting mixture was terminal isocyanate groups and the isocyanate index of the resulting mixture is above 100 and less than 115, and wherein:
   a. the quasi-isocyanate prepolymer is obtained by contacting
      i. a di-isocyanate having an average molecular weight of from 100 to 500, with
      ii. a high molecular weight diol having an average molecular weight of from 500 to 4500,
   wherein the amount of di-isocyanate is from 3 to 12 moles per mole of high molecular weight diol; and
   b. the quasi-hydroxyl prepolymer is obtained by contacting
      i. a true-isocyanate prepolymer which is prepared by contacting
         A. a di-isocyanate, having an average molecular weight of from 100 to 500, with
         B. a high molecular weight diol having an average molecular weight of from 500 to 4,500,
      wherein the amount of di-isocyanate is from 1.8 to 2.2 moles per mole of high molecular weight diol, with
      ii. a low molecular weight diol, having an average molecular weight of from 60 to 250,
   wherein the amount of low molecular weight diol is from 4 to 17 moles per mole of high molecular weight diol used to prepare the true-isocyanate prepolymer.

2. A process as claimed in claim 1, wherein the reaction mixture has an isocyanate index of from 101 to 105.

3. A process as claimed in claim 1, wherein the quasi-isocyanate prepolymer is prepared by a one-stage process, comprising adding from 3 to 12 moles of di-isocyanate to 1 mole of high molecular weight diol.

4. A process as claimed in claim 3, wherein the amount of di-isocyanate is from 4 to 6 moles.

5. A process as claimed in claim 1, wherein the quasi-hydroxyl prepolymer is prepared in a one-stage process, comprising adding from 4 to 17 moles of low molecular weight diol to the true-isocyanate prepolymer for each mole of high molecular weight diol used to prepare the true-isocyanate prepolymer.

6. A process as claimed in claim 5, wherein the amount of low molecular weight diol is from 5 to 9 moles.

7. A process as claimed in claim 1 for the preparation of microcellular polyurethane, wherein water is included in the reaction mixture.

8. A process as claimed in claim 7, wherein the amount of water is from 0.5 to 1.0 part per hundred parts of quasi-hydroxyl prepolymer plus quasi-isocyanate prepolymer.

9. A process as claimed in claim 1, wherein polytetrahydrofuran diol is premixed with the quasi-hydroxyl prepolymer.

10. A process as claimed in claim 1, wherein the average molecular weight of the high molecular diol is from 500 to 2,500.

11. A process as claimed in claim 10, wherein the high molecular weight diol is a poly-1,2-propane diol.

12. A process as claimed in claim 1, wherein the average molecular weight of the low molecular weight diol is from 60 to 128.

13. A process as claimed in claim 12, wherein the low molecular weight diol is selected from the group consisting of 1,4-butanediol and 1,6-hexanediol.

14. A process as claimed in claim 1, wherein the di-isocyanate has an average molecular weight of from 150 to 300.

15. A process as claimed in claim 14, wherein the di-isocyanate is selected from the group consisting of 4,4'-methylene diphenyl di-isocyanate and 1,5-di-isocyanatonaphthalene.

16. A process as claimed in claim 1, wherein the quasi-hydroxyl prepolymer and the quasi-isocyanate prepolymer are contacted at a temperature between 25° and 100°C.

* * * * *